United States Patent
Kirkhope

(10) Patent No.: US 9,200,488 B2
(45) Date of Patent: Dec. 1, 2015

(54) BEARING ASSEMBLY

(75) Inventor: Kennedy J. Kirkhope, Leduc (CA)

(73) Assignee: Halliburton Energy Services, Inc., Houston, TX (US)

( * ) Notice: Subject to any disclaimer, the term of this patent is extended or adjusted under 35 U.S.C. 154(b) by 567 days.

(21) Appl. No.: 13/515,044

(22) PCT Filed: Jan. 28, 2010

(86) PCT No.: PCT/CA2010/000124
§ 371 (c)(1),
(2), (4) Date: Jun. 11, 2012

(87) PCT Pub. No.: WO2011/091500
PCT Pub. Date: Aug. 4, 2011

(65) Prior Publication Data
US 2012/0285748 A1      Nov. 15, 2012

(51) Int. Cl.
*E21B 10/22* (2006.01)
*F16C 17/00* (2006.01)
*F16C 17/04* (2006.01)
*F16C 19/14* (2006.01)
*F16C 19/30* (2006.01)
(Continued)

(52) U.S. Cl.
CPC ............ *E21B 17/1064* (2013.01); *E21B 4/003* (2013.01); *F16C 17/04* (2013.01); *F16C 33/08* (2013.01); *F16C 33/107* (2013.01); *F16C 33/108* (2013.01); *F16C 33/109* (2013.01); *F16C 35/02* (2013.01); *F16C 2352/00* (2013.01)

(58) Field of Classification Search
CPC . E21B 17/1064; E21B 4/003; F16C 2352/00; F16C 33/043; F16C 17/10; F16C 33/08; F16C 33/107; F16C 35/02
USPC ............ 175/107, 320, 371, 337, 26; 384/276, 384/129, 456, 420, 590, 126, 97; 415/903
See application file for complete search history.

(56) References Cited

U.S. PATENT DOCUMENTS 2,937,008 A    5/1960  Whittle
2,996,340 A    8/1961  Macks
(Continued)

FOREIGN PATENT DOCUMENTS

WO         8801701        3/1988
WO      WO 88/01702       3/1988
(Continued)

OTHER PUBLICATIONS

"Kalsi Thrust Bearing—A Low-Friction, High-Capacity, Impact-Resistant Bearing," Kalsi Engineering, Inc., Sugar Land, Texas, U.S. A., downloaded from www.kalsi.com, dated 2003-2007 (4 pages).

*Primary Examiner* — Daniel P Stephenson
(74) *Attorney, Agent, or Firm* — Terrence N. Kuharchuk; Parlee McLaws LLP; Clive D. Menezes

(57) ABSTRACT

A bearing assembly for use in an apparatus having a housing and a shaft which is rotatably connected with the housing. A shaft extension extends from the interior of the housing at a first housing end. The shaft extension defines a first bearing shaft surface. The bearing assembly includes a first thrust bearing for transferring a first axial load between the shaft and the housing. The first thrust bearing is located axially between the first housing end and the first bearing shaft surface.

41 Claims, 6 Drawing Sheets

(51) Int. Cl.
  *F16C 33/04*    (2006.01)
  *E21B 17/10*    (2006.01)
  *E21B 4/00*     (2006.01)
  *F16C 33/08*    (2006.01)
  *F16C 33/10*    (2006.01)
  *F16C 35/02*    (2006.01)

(56) References Cited

U.S. PATENT DOCUMENTS

| | | | |
|---|---|---|---|
| 3,093,427 A * | 6/1963 | Vasta | 384/536 |
| 3,356,338 A | 12/1967 | Ioanesyan et al. | |
| 3,362,488 A | 1/1968 | Ioanesyan et al. | |
| 3,449,030 A | 6/1969 | Tiraspolsky et al. | |
| 3,456,746 A | 7/1969 | Garrison et al. | |
| 3,489,231 A | 1/1970 | Garrison et al. | |
| 3,594,106 A | 7/1971 | Garrison | |
| 3,630,634 A | 12/1971 | Mayall | |
| 3,666,330 A | 5/1972 | Dicky | |
| 3,722,608 A | 3/1973 | Faulk | |
| 3,754,835 A | 8/1973 | Ivanov et al. | |
| 3,800,277 A | 3/1974 | Patton et al. | |
| 3,879,094 A | 4/1975 | Tschirky et al. | |
| 3,894,818 A | 7/1975 | Tschirky | |
| 3,936,247 A | 2/1976 | Tschirky et al. | |
| 3,944,303 A | 3/1976 | Ioanesian et al. | |
| 4,029,368 A | 6/1977 | Tschirky et al. | |
| 4,120,542 A | 10/1978 | Bhateja et al. | |
| 4,135,772 A | 1/1979 | Stodt | |
| 4,199,201 A | 4/1980 | Trzeciak | |
| 4,240,683 A | 12/1980 | Crase | |
| 4,260,202 A | 4/1981 | Crase et al. | |
| 4,265,498 A | 5/1981 | Luce et al. | |
| 4,345,798 A | 8/1982 | Cortes | |
| 4,388,973 A | 6/1983 | Winkelmann et al. | |
| 4,410,054 A | 10/1983 | Nagel et al. | |
| 4,501,454 A | 2/1985 | Dennis et al. | |
| 4,511,193 A | 4/1985 | Geczy | |
| 4,560,014 A | 12/1985 | Geczy | |
| 4,620,601 A | 11/1986 | Nagel | |
| 4,657,090 A * | 4/1987 | Geczy | 175/92 |
| 4,710,036 A * | 12/1987 | Geczy | 384/275 |
| 4,720,199 A * | 1/1988 | Geczy et al. | 384/282 |
| 4,729,675 A | 3/1988 | Trzeciak et al. | |
| 4,732,491 A * | 3/1988 | Geczy | 384/95 |
| 5,037,212 A * | 8/1991 | Justman et al. | 384/97 |
| 5,150,972 A * | 9/1992 | Wenzel | 384/97 |
| 5,253,939 A * | 10/1993 | Hall | 384/303 |
| 5,337,840 A | 8/1994 | Chancey et al. | |
| 5,350,242 A | 9/1994 | Wenzel | |
| 5,385,407 A | 1/1995 | De Lucia | |
| 5,503,479 A | 4/1996 | Ide | |
| 5,513,917 A | 5/1996 | Ide et al. | |
| 5,515,458 A | 5/1996 | Ide | |
| 5,549,459 A * | 8/1996 | Nixon | 417/423.12 |
| 5,664,891 A | 9/1997 | Kutinsky et al. | |
| 5,690,434 A | 11/1997 | Beshoory et al. | |
| 5,704,838 A | 1/1998 | Teale | |
| 5,738,358 A | 4/1998 | Kalsi et al. | |
| 5,875,859 A | 3/1999 | Ikeda et al. | |
| 5,911,284 A | 6/1999 | von Gynz-Rekowski | |
| 5,956,995 A | 9/1999 | Herben et al. | |
| 6,190,050 B1 | 2/2001 | Campbell | |
| 6,250,806 B1 | 6/2001 | Beshoory | |
| 6,269,892 B1 | 8/2001 | Boulton et al. | |
| 6,349,778 B1 | 2/2002 | Blair et al. | |
| 6,415,878 B1 | 7/2002 | Cargill et al. | |
| 6,416,225 B1 | 7/2002 | Cioceanu et al. | |
| 6,470,977 B1 | 10/2002 | Chen et al. | |
| 6,488,103 B1 | 12/2002 | Dennis et al. | |
| 6,561,290 B2 | 5/2003 | Blair et al. | |
| 6,581,699 B1 | 6/2003 | Chen et al. | |
| 6,629,571 B1 | 10/2003 | Downie | |
| 6,640,909 B1 | 11/2003 | Vandenberg et al. | |
| 6,769,499 B2 | 8/2004 | Cargill et al. | |
| 6,779,925 B2 | 8/2004 | Coates | |
| 6,827,160 B2 | 12/2004 | Blair et al. | |
| 6,840,336 B2 | 1/2005 | Schaaf et al. | |
| 6,905,319 B2 | 6/2005 | Guo | |
| 6,920,946 B2 | 7/2005 | Oglesby | |
| 6,949,025 B1 | 9/2005 | Kraus et al. | |
| 7,104,698 B1 | 9/2006 | Van Drentham-Susman | |
| 7,147,066 B2 | 12/2006 | Chen et al. | |
| 7,186,182 B2 | 3/2007 | Wenzel et al. | |
| 7,204,324 B2 | 4/2007 | Gleitman et al. | |
| 7,267,184 B2 | 9/2007 | Helms et al. | |
| 7,287,604 B2 | 10/2007 | Aronstam et al. | |
| 7,306,058 B2 | 12/2007 | Cargill et al. | |
| 7,306,059 B2 | 12/2007 | Ide | |
| 7,401,982 B2 | 7/2008 | Thompson | |
| 7,407,020 B2 | 8/2008 | Gleitman et al. | |
| 7,416,034 B2 | 8/2008 | Downie et al. | |
| 7,500,787 B2 | 3/2009 | Cioceanu | |
| 7,527,105 B2 | 5/2009 | Hall et al. | |
| 7,549,487 B2 | 6/2009 | LeBlanc et al. | |
| 7,552,782 B1 | 6/2009 | Sexton et al. | |
| 8,215,841 B2 | 7/2012 | Wenzel | |
| 8,701,797 B2 | 4/2014 | Baudoin | |
| 2002/0195278 A1 | 12/2002 | Vandenberg et al. | |
| 2003/0015352 A1 | 1/2003 | Robin | |
| 2007/0125578 A1 | 6/2007 | McDonald et al. | |
| 2008/0029304 A1 | 2/2008 | LeBlanc et al. | |
| 2008/0115976 A1 | 5/2008 | Ide | |
| 2008/0264693 A1 | 10/2008 | Downie et al. | |
| 2009/0010584 A1 | 1/2009 | Jang et al. | |
| 2009/0046967 A1 * | 2/2009 | Pope et al. | 384/492 |
| 2011/0147091 A1 | 6/2011 | Bullin | |
| 2012/0285748 A1 * | 11/2012 | Kirkhope | 175/371 |
| 2012/0325561 A1 | 12/2012 | Leblanc et al. | |
| 2013/0092445 A1 | 4/2013 | Baudoin | |

FOREIGN PATENT DOCUMENTS

| | | | |
|---|---|---|---|
| WO | WO 00/79146 | 12/2000 | |
| WO | WO 2008/015402 | 2/2008 | |
| WO | WO 2009151608 A1 * | 12/2009 | E21B 4/00 |

* cited by examiner

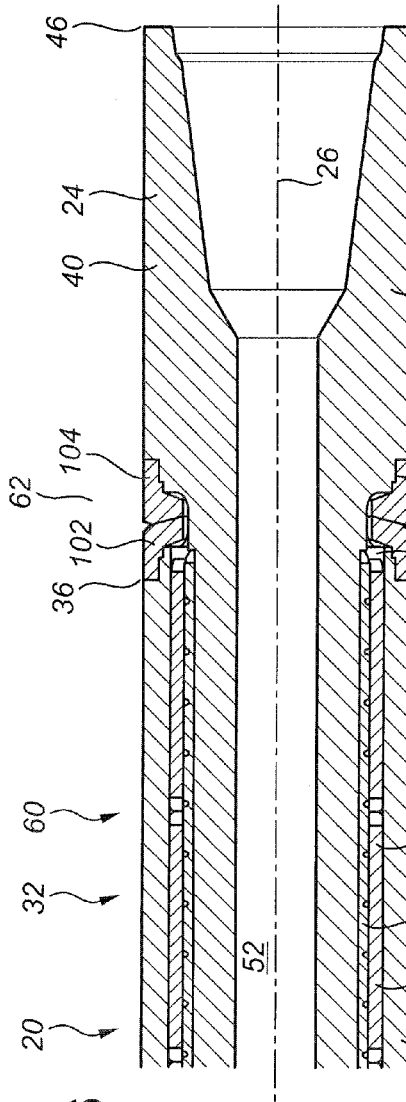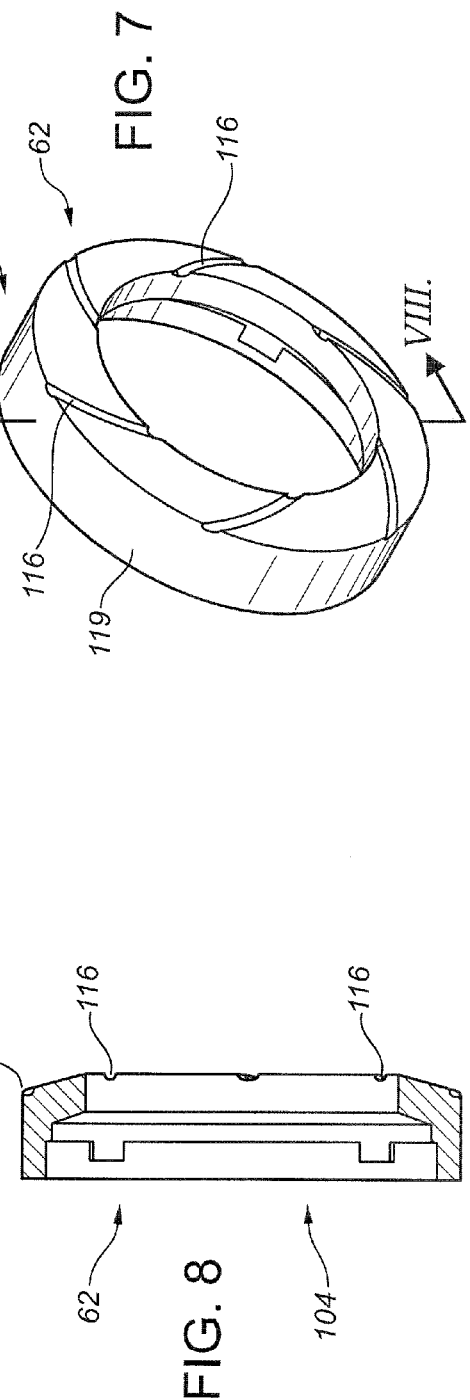

BEARING ASSEMBLY

TECHNICAL FIELD

A bearing assembly for use in an apparatus having a shaft rotatably connected with a housing.

BACKGROUND OF THE INVENTION

Apparatus which include a shaft rotatably connected with a housing are common in many different fields of art. In such apparatus, the shaft may be rotatably connected with the housing such that axial loads along the shaft axis and/or radial loads transverse to the shaft axis may be transferred between the shaft and the housing. Such apparatus may include one or more thrust bearings for transferring the axial loads and one or more radial bearings for transferring the radial loads.

Axial loads will tend to move the housing and the shaft axially relative to each other and may be experienced in two opposite directions. In some cases, a single thrust bearing or a single set of thrust bearings may be utilized to transfer the axial loads in the two directions. In some cases, separate thrust bearings or sets of thrust bearings may be utilized to transfer the axial loads in the two directions. Thrust bearings are typically located within the interior of the housing.

Radial loads will tend to move the housing and the shaft laterally relative to each other and may be experienced in any lateral direction which is transverse to the shaft axis. In some cases, a single radial bearing or a single set of radial bearings may be utilized to transfer the radial loads in all directions by configuring the radial bearing so that it surrounds the shaft in an annular space which is provided between the shaft and the housing.

Apparatus which include a shaft rotatably connected with a housing are common in oil and gas industry applications, including applications which involve the drilling, completion, servicing and/or operation of boreholes and wells. Many of these apparatus are configured to be inserted into a borehole and to be used in a downhole environment.

BRIEF DESCRIPTION OF DRAWINGS

Embodiments of the invention will now be described with reference to the accompanying drawings, in which:

FIG. 6 is a longitudinal section assembly drawing of a portion of the bearing section depicted in FIG. 1, detailing a fourth alternate embodiment of the first thrust bearing of the bearing assembly.

FIG. 7 is a pictorial view of a component of the fourth alternate embodiment of the first thrust bearing which is depicted in FIG. 6.

FIG. 8 is a section view of the component of the fourth alternate embodiment of the first thrust bearing which is depicted in FIG. 7, taken along section line 8-8 in FIG. 7.

DETAILED DESCRIPTION

Figure 1:
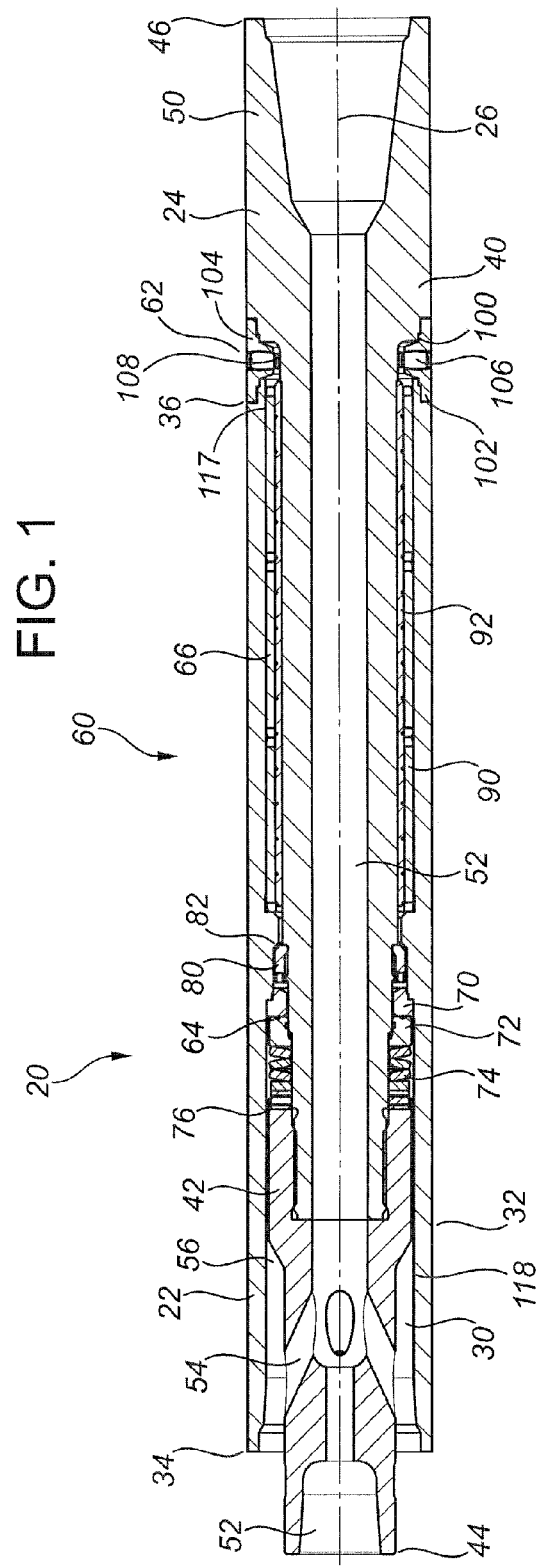
FIG. 1 is a longitudinal section assembly drawing of a bearing section of a drilling motor, depicting a bearing assembly according to an embodiment of the invention.

References in this document to dimensions, to orientations, to operating parameters, to ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

The invention is directed at a bearing assembly for use in an apparatus comprising a housing and a shaft, wherein the shaft is rotatably connected with the housing.

The apparatus may be any such type of apparatus, and may have any function or purpose. In some embodiments, the apparatus may be an apparatus for use in drilling, completing, servicing and/or operating a borehole or a well. As non-limiting examples, the apparatus may be a drilling motor, a production pump, a non-rotating stabilizer, a ream swivel, or a steering tool such as a rotary steerable drilling tool.

The housing may be comprised of a single piece or component, or may be comprised of a plurality of pieces or components which are connected together. Similarly, the shaft may be comprised of a single piece or component, or may be comprised of a plurality of pieces or components which are connected together.

The bearing assembly is comprised of a first thrust bearing for transferring a first axial load between the shaft and the housing. In some embodiments, the bearing assembly may be further comprised of a radial bearing for transferring a radial load between the shaft and the housing and/or a second thrust bearing for transferring a second axial load between the shaft and the housing.

The first axial load is in a first axial direction and the second axial load is in a second axial direction. The first axial direction is opposite to the second axial direction.

The shaft of the apparatus has a shaft axis, and the housing of the apparatus defines an interior of the housing, an exterior of the housing and a first housing end. In some embodiments, the shaft may be comprised of a first shaft extension which extends from the interior of the housing at the first housing end.

In some embodiments, the housing may further define a second housing end. In some embodiments, the shaft may be comprised of a second shaft extension which extends from the interior of the housing at the second housing end. In some embodiments, the shaft may be comprised of a first shaft extension which extends from the interior of the housing at the first housing end and a second shaft extension which extends from the interior of the housing at the second housing end.

The first thrust bearing is located at the exterior of the housing. In other words, the first thrust bearing is not contained within the housing. Locating the first thrust bearing at the exterior of the housing enables the first thrust bearing to provide a larger bearing area and to have a greater potential load capacity than if the first thrust bearing were contained within the housing. Although the first thrust bearing is located at the exterior of the housing, the first thrust bearing may be comprised of the housing so that the housing may comprise a component of the first thrust bearing.

In some embodiments, the first shaft extension may define a first bearing shaft surface. In some embodiments, the first thrust bearing may be located axially between the first housing end and the first bearing shaft surface. In some embodiments in which the first thrust bearing is located axially between the first housing end and the first bearing shaft surface, the first thrust bearing may be comprised of the first housing end and/or the first bearing shaft surface.

The first housing end has an inner dimension and the first thrust bearing has an outer dimension. In some embodiments, the outer dimension of the first thrust bearing may be greater than the inner dimension of the first housing end. The housing also has a maximum inner dimension. In some embodiments, the outer dimension of the first thrust bearing may be greater than the maximum inner dimension of the housing.

In some embodiments in which the bearing assembly is comprised of a second thrust bearing for transferring a second axial load between the shaft and the housing, the second thrust bearing may be located within the interior of the housing. In some embodiments, the second thrust bearing may be located at the exterior of the housing.

In some embodiments in which the bearing assembly is comprised of a radial bearing for transferring a radial load between the shaft and the housing, the radial bearing may be located within the interior of the housing.

In some embodiments, the radial bearing may be located axially between the first thrust bearing and the second thrust bearing. In some embodiments, the length of the radial bearing may be maximized in order to maximize the bearing capacity of the radial bearing. In some embodiments, the radial bearing may be located axially between the first thrust bearing and the second thrust bearing and the length of the radial bearing may be maximized.

The radial bearing may be comprised of any type of radial bearing which is suitable for use in the environment in which the apparatus will be used. As non-limiting examples, the radial bearing may be comprised of one or more plain bearings or one or more rolling element bearings.

In some embodiments, the radial bearing may be comprised of a radial bearing housing component associated with the housing. In some embodiments, the radial bearing housing component may be comprised of a radial bearing housing sleeve. In some embodiments, the radial bearing housing sleeve may be axially segmented so that the radial bearing housing sleeve is comprised of a plurality of axial segments. In some embodiments, the radial bearing may be further comprised of a radial bearing shaft component associated with the shaft. In some embodiments, the radial bearing shaft component may be comprised of a radial bearing shaft sleeve. In some embodiments, the radial bearing shaft sleeve may be axially segmented so that the radial bearing shaft sleeve is comprised of a plurality of axial segments.

In some embodiments, the radial bearing housing component may be constructed of a harder and/or more wear resistant material than the radial bearing shaft component in order to focus wear of the radial bearing upon the radial bearing shaft component.

The first housing end may be a distal end of the housing or a proximal end of the housing. The second housing end may be a distal end of the housing or a proximal end of the housing.

In some embodiments, the first axial load may be expected to be greater than the second axial load, so that the first thrust bearing may be expected to transfer greater axial loads than the second thrust bearing.

In some embodiments in which the apparatus is a drilling motor, the housing may be a drilling motor housing having a distal end and a proximal end and the shaft may be a drive shaft for the drilling motor. In some embodiments, the distal end of the drilling motor housing may be the first housing end so that an axial reaction force exerted on the drive shaft by the end of a borehole can be transferred to the drilling motor housing by the first thrust bearing.

In some embodiments in which the apparatus is a non-rotating stabilizer, a ream swivel or a steering tool, the housing may be a non-rotating sleeve having a distal end and a proximal end. The shaft may be a drilling pipe which extends through the housing or the shaft may be adapted to connect with a drilling pipe. In some embodiments, the proximal end of the non-rotating sleeve may be the first housing end so that an axial reaction force exerted on the non-rotating sleeve by the sides of a borehole can be transferred to the drilling pipe by the first thrust bearing.

The first thrust bearing may be comprised of any type of thrust bearing which is suitable for use in the environment in which the apparatus will be used. As non-limiting examples, the first thrust bearing may be comprised of a plain bearing or a rolling element bearing.

Similarly, the second thrust bearing may be comprised of any type of thrust bearing which is suitable for use in the environment in which the apparatus will be used. As non-limiting examples, the second thrust bearing may be comprised of a plain bearing or a rolling element bearing.

As used herein, a "plain bearing" is a bearing which uses a sliding motion to facilitate relative movement between two parts. A plain bearing typically comprises two bearing components which slide relative to each other between complementary bearing surfaces. One or more of the complementary bearing surfaces may be comprised of a hard material which is resistant to wear. Plain bearings may be lubricated or non-lubricated.

Lubricated plain bearings include as examples boundary lubricated bearings in which the bearing components rub together in partial contact with a thin film of lubricant separating them, hydrodynamically lubricated bearings in which a film of lubricant completely separates the bearing components, mixed film lubricated bearings in which the bearing components support their load partially through boundary lubrication and partially through hydrodynamic lubrication, and hydrostatically lubricated bearings in which the bearing components are separated by a pressurized lubricant fluid.

As used herein, a "rolling element bearing" is a bearing which uses a rolling motion to facilitate relative movement between two parts. A rolling element bearing typically comprises two bearing components defining races which are separated by one or more rolling elements so that the rolling element or elements roll along the races. The rolling elements may be comprised of balls, rollers or any other suitable shape or structure, and the rolling elements may be suspended in a cage. Rolling element bearings may be lubricated or non-lubricated.

In some embodiments, the first thrust bearing may be a lubricated bearing. The first thrust bearing may be lubricated using any suitable lubricant. In some embodiments, the first thrust bearing may be lubricated with a lubricating oil. In some embodiments, the first thrust bearing may be lubricated with a grease. In some embodiments, the first thrust bearing may be lubricated with a working fluid which is passed through the apparatus, such as water or a drilling fluid.

As previously indicated, the first thrust bearing is located at the exterior of the housing. As a result, in order to facilitate lubricating the first thrust bearing with a lubricating oil or a grease, the first thrust bearing may be comprised of a shroud for partially or fully isolating the first thrust bearing from the environment at the exterior of the housing. Partially isolating the first thrust bearing from the environment at the exterior of the housing facilitates lubricating the first thrust bearing with a relatively high viscosity lubricant such as a grease. Fully isolating the first thrust bearing from the environment at the exterior of the housing facilitates lubricating the first thrust bearing with a relatively low viscosity lubricant such as a lubricating oil. Full isolation of the first thrust bearing from the environment at the exterior of the housing may be achieved by providing a seal between the shroud and either the housing or the shaft.

In some embodiments, the second thrust bearing may be a lubricated bearing. The second thrust bearing may be lubricated using any suitable lubricant. In some embodiments, the second thrust bearing may be lubricated with a lubricating oil. In some embodiments, the second thrust bearing may be lubricated with a grease. In some embodiments, the second thrust bearing may be lubricated with a working fluid which is passed through the apparatus, such as water or a drilling fluid.

The second thrust bearing may be located either at the exterior of the housing or within the interior of the housing. In embodiments in which the second thrust bearing is located at the exterior of the housing, similar considerations as those pertaining to the first thrust bearing may apply. In particular, in order to facilitate lubricating the second thrust bearing with a lubricating oil or a grease where the second thrust bearing is located at the exterior of the housing, the second thrust bearing may be comprised of a shroud for partially or fully isolating the second thrust bearing from the environment at the exterior of the housing.

In some embodiments, the radial bearing may be a lubricated bearing. The radial bearing may be lubricated using any suitable lubricant. In some embodiments, the radial bearing may be lubricated with a lubricating oil. In some embodiments, the radial bearing may be lubricated with a grease. In some embodiments, the radial bearing may be lubricated with a working fluid which is passed through the apparatus, such as water or a drilling fluid.

In embodiments in which the first thrust bearing, the second thrust bearing, and/or the radial bearing are lubricated with a lubricating oil, the apparatus may be comprised of an isolated section of the housing for containing the lubricating oil.

Referring to FIGS. 1-10, a number of non-limiting examples of possible embodiments of the invention are depicted.

Figure 9:
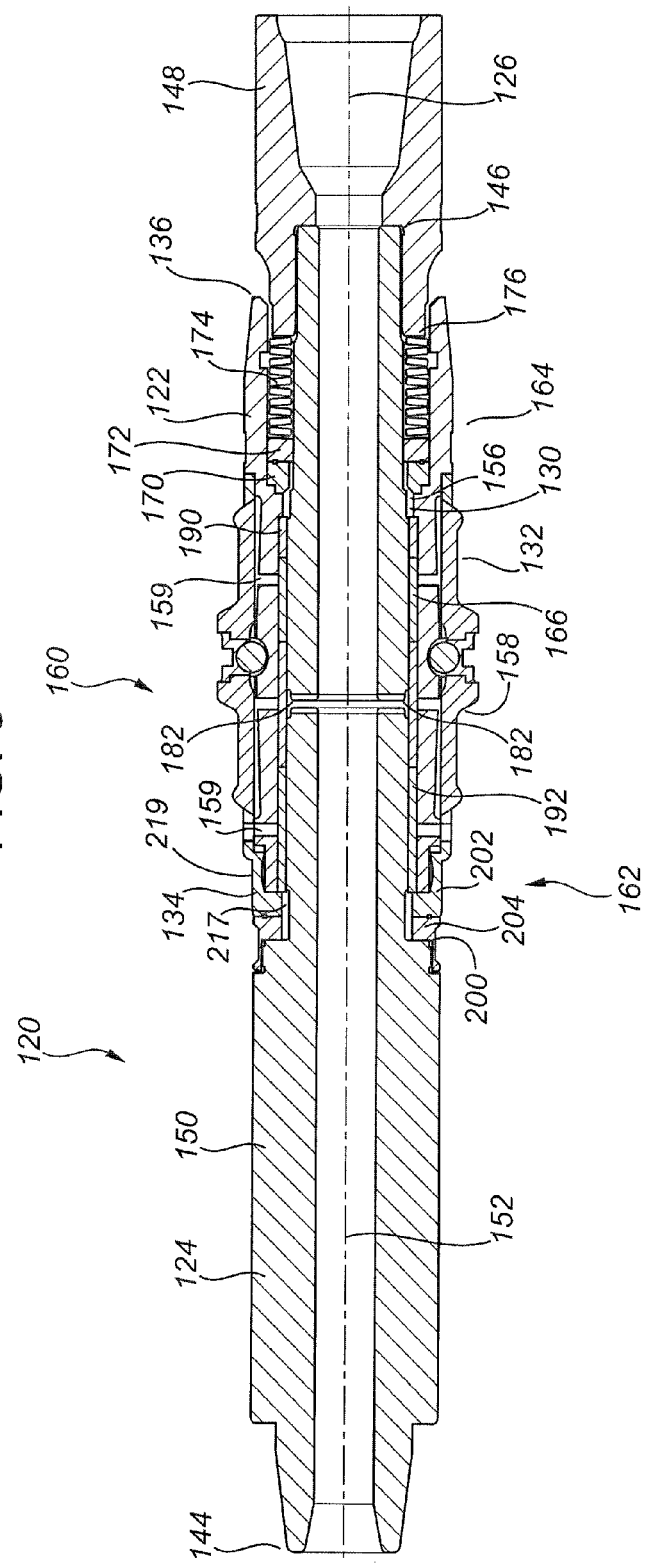
FIG. 9 is a longitudinal section assembly drawing of a non-rotating stabilizer, depicting a bearing assembly according to an embodiment of the invention.
Figure 10:
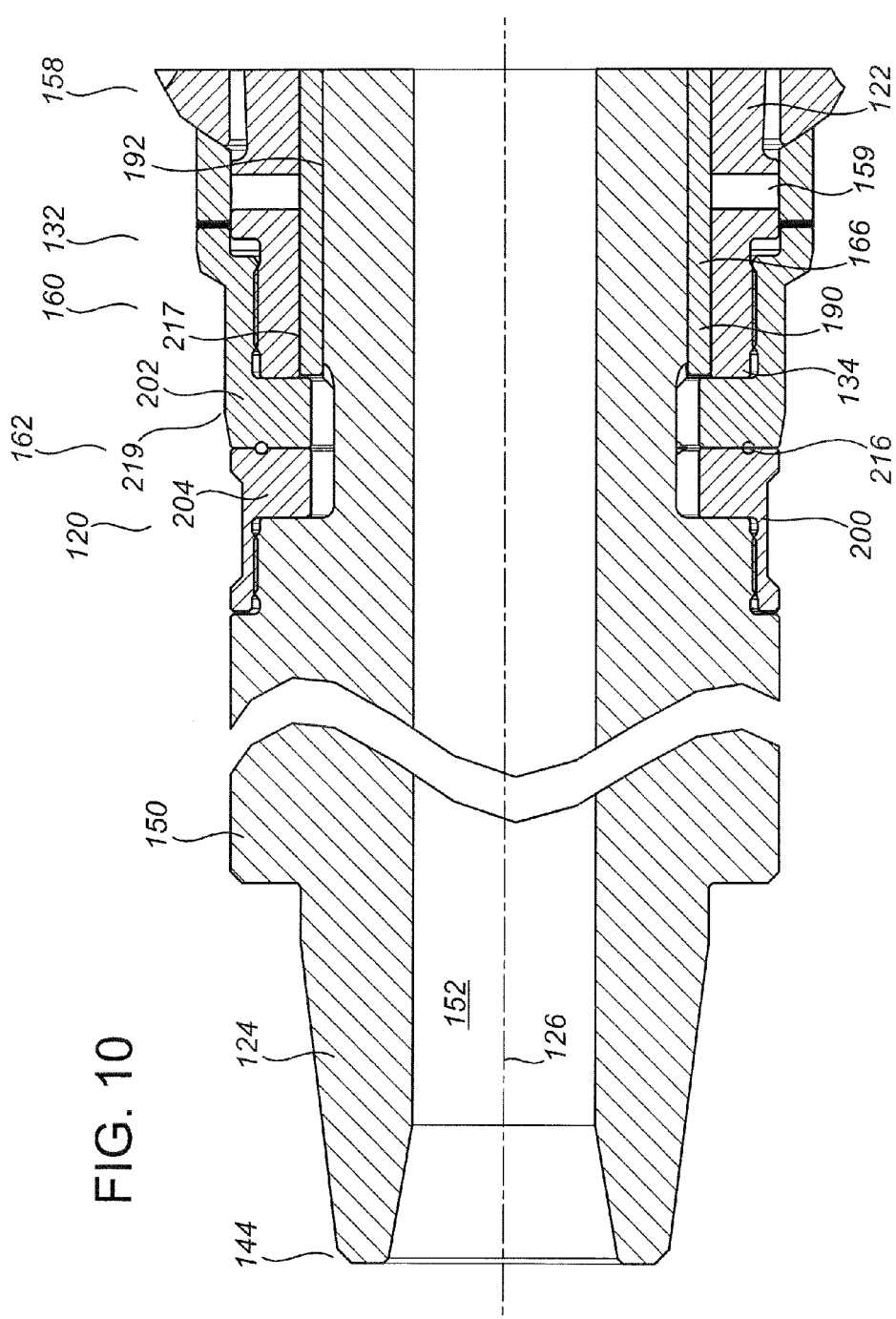
FIG. 10 is a longitudinal section assembly drawing of a portion of the bearing assembly depicted in FIG. 9, detailing the embodiment of the first thrust bearing of the bearing assembly which is depicted in FIG. 9.

In FIGS. 1-8, the apparatus is a drilling motor, such as a progressing cavity motor (PDM), which is configured for connection with a drill string in order to drill a borehole. In FIGS. 9-10, the apparatus is a non-rotating stabilizer which is configured to be connected with a drill string, a drilling motor or some other downhole apparatus during drilling of a borehole to stabilize the drill string as the drill string advances through the borehole.

A typical progressing cavity drilling motor includes a number of components or sections which are connected end to end. A proximal end of a power section (not shown) may be adapted to be connected with drill pipe (not shown), coiled tubing (not shown), a steering tool (not shown), or with another tool or component of a drill string (not shown). A proximal end of a transmission section (not shown) may be connected directly or indirectly to the distal end of the power section. A proximal end of a bearing section may be connected directly or indirectly to the distal end of the transmission section.

Referring to FIGS. 1-8, the bearing assembly of the invention is associated with the bearing section of the drilling motor as the apparatus.

Referring to FIG. 1, a bearing section (20) of a drilling motor comprises a housing (22) and a shaft (24). The shaft (24) has a shaft axis (26). The housing (22) is a bearing section drilling motor housing. The housing (22) defines an interior (30) of the housing (22), an exterior (32) of the housing (22), a proximal housing end (34), and a distal housing end (36). The proximal housing end (34) of the housing (22) is adapted to be connected with a transmission section housing (not shown).

The shaft (24) extends through the interior (30) of the housing (22) and is rotatably connected with the housing (22) for rotation about the shaft axis (26). The shaft (24) is comprised of a drive shaft (40) and a drive shaft cap (42). The shaft (24) defines a proximal shaft end (44) and a distal shaft end (46).

The distal shaft end (46) may be adapted to be connected with a drill bit (not shown) or may be adapted to be connected with drill pipe (not shown), coiled tubing (not shown), a steering tool (not shown), or with another tool or component of a drill string (not shown).

The proximal shaft end (44) is typically adapted to be connected with a transmission shaft (not shown). The transmission shaft may typically be comprised of a flex shaft or a universal joint/intermediate shaft assembly.

The drive shaft (34) comprises a shaft extension (50) which extends from the interior (30) of the housing (22) at the distal housing end (36) and terminates at the distal shaft end (46).

The shaft (24) defines a shaft bore (52) which extends through the shaft (24). A purpose of the shaft bore (52) is to convey a drilling fluid (not shown) through the shaft (24) toward the distal shaft end (46) and thus to the components of the drill string, such as the drill bit, which may be located below the distal shaft end (46). The drive shaft cap (42) defines a flow diverter (54) which serves to divert a portion of a flow of drilling fluid from an annular space (56) between the housing (22) and the shaft (24) into the shaft bore (52) and thus to the distal shaft end (46) so that the drilling fluid may be available to lubricate the drill bit.

The bearing section (20) of the drilling motor contains a bearing assembly (60). As depicted in FIG. 1, the bearing assembly (60) is comprised of a first thrust bearing (62), a second thrust bearing (64), and a radial bearing (66).

The first thrust bearing (62) is located at the exterior (32) of the housing (22). As depicted in FIG. 1, the second thrust bearing (64) is located within the interior (30) of the housing (22). As depicted in FIG. 1, the radial bearing (66) is located within the interior (30) of the housing (22) and is located axially between the first thrust bearing (62) and the second thrust bearing (64).

The purpose of the first thrust bearing (62) is to transfer a first axial load between the shaft (24) and the housing (22). The purpose of the second thrust bearing (64) is to transfer a second axial load between the shaft (24) and the housing (22). The purpose of the radial bearing (66) is to transfer a radial load between the shaft (24) and the housing (22).

The first axial load is in a first axial direction, the second axial load is in a second axial direction, and the first axial direction is opposite to the second axial direction. The bearing assembly (60) is configured so that the expected maximum first axial load is greater than the expected maximum second axial load.

In the embodiments of FIGS. 1-8 in which the apparatus is a drilling motor, the axial loads will place the shaft (24) in either compression or tension. The shaft (24) will tend to be in compression during drilling as the end of the borehole exerts a reaction force on the drill bit and the shaft (24) to counter the weight on bit. The shaft (24) will tend to be in tension during removal of the drill string from the borehole, particularly if the shaft (24) becomes stuck in the borehole during removal of the drill string so that the shaft (24) must effectively be pulled from the borehole by the housing (24).

These compressive and tensile loads must be transferred between the shaft (24) and the housing (22) since the shaft (24) is connected with the housing (22) and the housing (22) is connected with the drill string. Typically in the use of a drilling motor, the maximum compressive load on the shaft (24) will be greater than the maximum tensile load on the shaft (24).

As a result, in the embodiments of FIGS. 1-8, the first axial direction is the direction in which the axial load will place the shaft (24) in compression so that the first axial load is a compressive load on the shaft (24), and the second axial direction is the direction in which the axial load will place the shaft (24) in tension so that the second axial load is a tensile load on the shaft (24).

In the embodiments of FIGS. 1-8, the second thrust bearing (64) is located within the interior (30) of the housing (22). More particularly, the second thrust bearing (64) is contained in the annular space (56) between the housing (22) and the shaft (24).

As depicted in FIG. 1, the second thrust bearing (64) is a plain bearing comprising a second thrust bearing housing component (70) and a second thrust bearing shaft component (72). The second thrust bearing housing component (70) is keyed or otherwise fixedly connected with the housing (22) so that it will rotate with the housing (22). The second thrust bearing shaft component (72) is keyed or otherwise fixedly connected with the shaft (24) so that it will rotate with the shaft (24). The second thrust bearing housing component (70) and the second thrust bearing shaft component (72) provide complementary bearing surfaces which may be hardfaced with either diamond or carbide as either a solid matrix affixed to the bearing surfaces or as inserts pressed into the bearing surfaces.

In the embodiments of FIGS. 1-8, the second thrust bearing (64) further comprises a preloading mechanism (74). As depicted in FIG. 1, the preloading mechanism (74) is comprised of a plurality of spring elements, such as Belleville springs which are interposed between a shoulder (76) on the drive shaft cap (42) and the second thrust bearing shaft component (72). The preloading mechanism (74) urges the second thrust bearing shaft component (72) into engagement with the second thrust bearing housing component (70) and provides travel to accommodate an amount of relative axial movement between the housing (22) and the shaft (24).

Referring again to FIG. 1, the bearing section (20) of the drilling motor further comprises a drive shaft catcher (80) which is keyed or otherwise connected with the shaft (24). The drive shaft catcher (80) provides a protrusion on the shaft (24) which is configured to engage a shoulder (82) in the housing (22) to limit the amount of relative axial movement between the housing (22) and the shaft (24).

As depicted in FIG. 1, the second thrust bearing (64) is a lubricated plain bearing which is lubricated using drilling fluid as a lubricant. The lubricating drilling fluid passes from the proximal housing end (34) through the interior (30) of the housing (22) in the annular space (56) between the housing (22) and the shaft (24) and thus comes into contact with the second thrust bearing (64).

The bearing surfaces of the second thrust bearing housing component (70) and/or the second thrust bearing shaft component (72) are provided with grooves (not shown in FIG. 1) to facilitate the passage of the drilling fluid through the housing (22) and past the second thrust bearing (64). Alternatively, if the second thrust bearing (64) is not lubricated using drilling fluid as a lubricant so that it is not necessary to pass drilling fluid through the second thrust bearing (64), the grooves may not be required.

In the embodiments of FIGS. 1-8, the radial bearing (66) is a plain bearing which is located within the interior (30) of the housing (22) and which is located axially between the first thrust bearing (62) and the second thrust bearing (64).

As depicted in FIG. 1, the radial bearing (66) extends axially for substantially the entire length between the first thrust bearing (62) and the second thrust bearing (64). In addition, due to the location of the first thrust bearing (62) at the exterior (32) of the housing (22) the radial bearing (66) may be located adjacent to the distal housing end (36), which may be relatively close to the drill bit where radial loads (i.e., side loads) on the drilling motor are generated, particularly during directional drilling.

Referring to FIG. 1, the radial bearing (66) is comprised of a radial bearing housing component (90) associated with the housing (22). The radial bearing housing component (90) may be comprised of the housing (22), in which case the housing (22) may be hardfaced to provide a wear resistant bearing surface on the housing (22). As depicted in FIG. 1, the radial bearing housing component (90) is comprised of a radial bearing housing sleeve which is either pressed into the housing (22) or mounted in a carrier (not shown) which is formed in the housing (22).

As depicted in FIG. 1, the radial bearing housing sleeve is axially segmented so that the radial bearing housing sleeve is comprised of a plurality of axial segments. The radial bearing housing sleeve is axially segmented so that bending stresses exerted on the housing (22) do not crack or otherwise damage the radial bearing housing sleeve.

Referring to FIG. 1, the radial bearing (66) is further comprised of a radial bearing shaft component (92) associated with the shaft (24). The radial bearing shaft component (92) may be comprised of the shaft (24), in which case the shaft (24) may be hardfaced to provide a wear resistant bearing surface on the shaft (24). As depicted in FIG. 1, the radial bearing shaft component (92) is comprised of a radial bearing shaft sleeve which may be pressed onto the shaft (24).

In the embodiments of FIGS. 1-8, the radial bearing housing component (90) is constructed of a more wear resistant material than the radial bearing shaft component (92) so that the radial bearing shaft component (92) wears preferentially to the radial bearing housing component (90). The purpose of this feature is that the wear on the radial bearing shaft component (92) will typically be relatively uniform around its circumference because of rotation of the shaft (24), while the wear on the radial bearing housing component (90) may be somewhat uneven around its circumference, particularly where the drilling motor is used in directional drilling applications where the radial forces on the housing (22) may be exerted in one direction for an extended period of time. By focusing wear of the radial bearing (66) on the radial bearing shaft component (92) in this manner, the wear of the radial bearing (66) will tend to be distributed around the entire circumference of the radial bearing shaft component (92) while the wear of the radial bearing housing component (90) will be minimized.

As depicted in FIG. 1, the radial bearing (66) is a lubricated plain bearing which is lubricated using drilling fluid as a lubricant. The lubricating drilling fluid passes from the proximal housing end (34) through the interior (30) of the housing (22) in the annular space (56) between the housing (22) and the shaft (24), through the second thrust bearing (64), and thus comes into contact with the radial bearing (66). Adequate clearance is provided between the radial bearing housing component (90) and the radial bearing shaft component (92) to facilitate the passage of the drilling fluid through the housing (22) and past the radial bearing (66).

Figure 2:
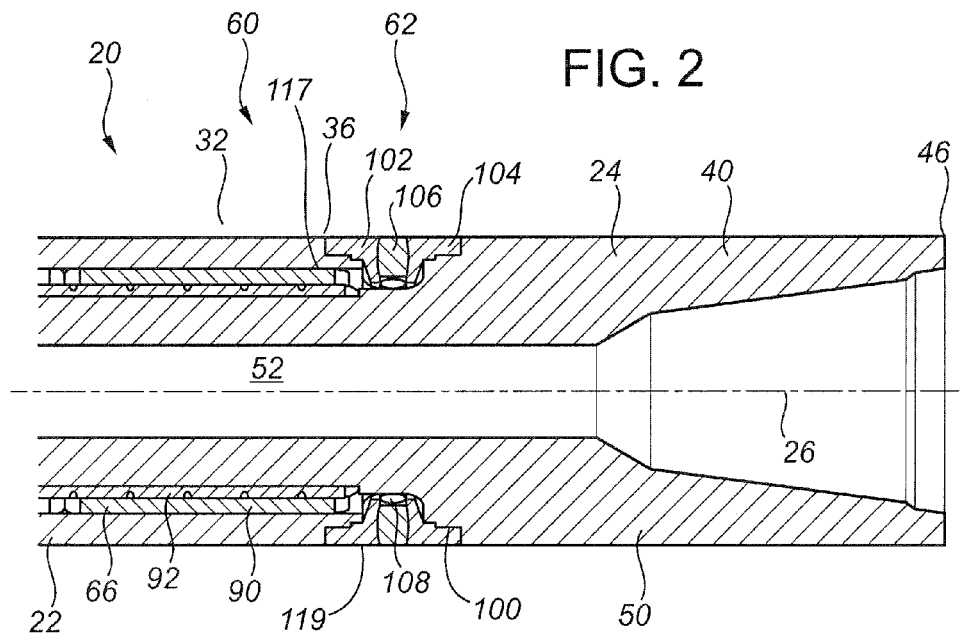
FIG. 2 is a longitudinal section assembly drawing of a portion of the bearing section depicted in FIG. 1, detailing the embodiment of the first thrust bearing of the bearing assembly which is depicted in FIG. 1.

In the embodiment of FIGS. 1-2, the first thrust bearing (62) is a rolling element bearing which is located at the exterior (32) of the housing (22). More particularly, as depicted in both FIG. 1 and in the detail drawing of FIG. 2, the shaft extension (50) defines a first bearing shaft surface (100) and the first thrust bearing (62) is located axially between the distal housing end (36) and the first bearing shaft surface (100). The distal housing end (36) and the first bearing shaft surface (100) provide surfaces on the housing (22) and the shaft (24) respectively to support the first thrust bearing (62).

In the embodiment of FIGS. 1-2, the first thrust bearing (62) is comprised of a first thrust bearing housing component (102) and a first thrust bearing shaft component (104) defining complementary races which are separated by a first thrust bearing rolling element component (106). As depicted in FIG. 1 and FIG. 2, the first thrust bearing rolling element component (106) is comprised of a plurality of rolling elements which are suspended in a rolling element cage (108). As depicted in FIG. 1 and FIG. 2, the rolling elements are rollers.

As depicted in FIG. 1 and FIG. 2, the first thrust bearing housing component (102) is fixedly connected with the housing (22) by being threadably connected with the housing (22) adjacent to the distal housing end (36). The first thrust bearing shaft component (104) is fixedly connected with the shaft (24) by being threadably connected with the shaft (24) adjacent to the first bearing shaft surface (100). Alternatively, the first thrust bearing housing component (102) and/or the first thrust bearing shaft component (104) may be connected with the housing (22) and the shaft (24) respectively in some other manner or may be integrally formed with the housing (22) and the shaft (24) respectively.

As depicted in FIG. 1 and FIG. 2, the first thrust bearing (62) is a lubricated rolling element bearing which is lubricated using drilling fluid as a lubricant. The lubricating drilling fluid passes from the proximal housing end (34) through the interior (30) of the housing (22) in the annular space (56) between the housing (22) and the shaft (24), through the second thrust bearing (64), through the radial bearing (66), and thus comes into contact with the first thrust bearing (62). Adequate clearance is provided through the rolling element cage (108) to facilitate the passage of the drilling fluid past the first thrust bearing (62) to the exterior (32) of the housing (22).

Figure 3:
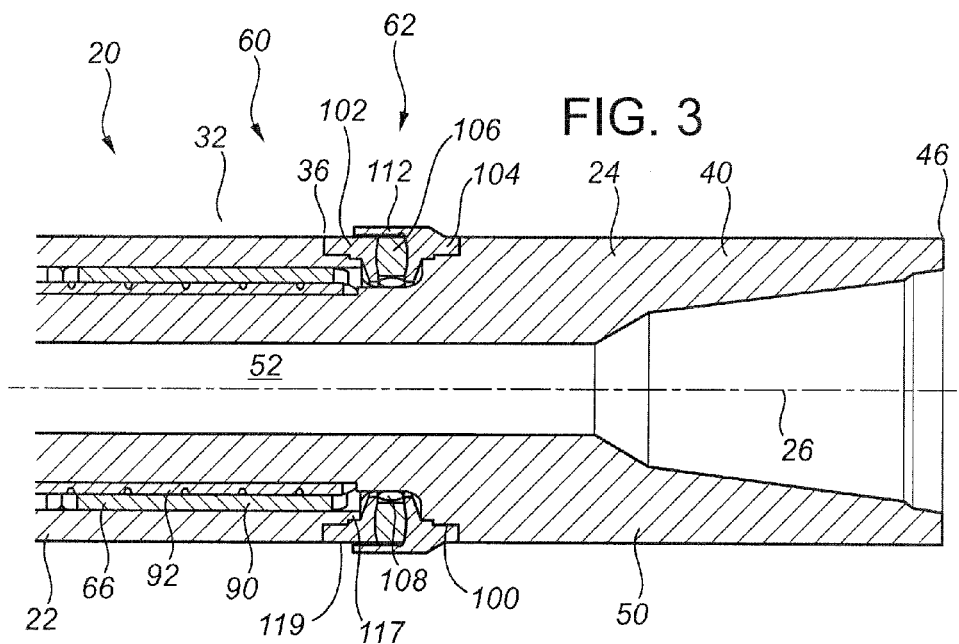
FIG. 3 is a longitudinal section assembly drawing of a portion of the bearing section depicted in FIG. 1, detailing a first alternate embodiment of the first thrust bearing of the bearing assembly.
Figure 4:
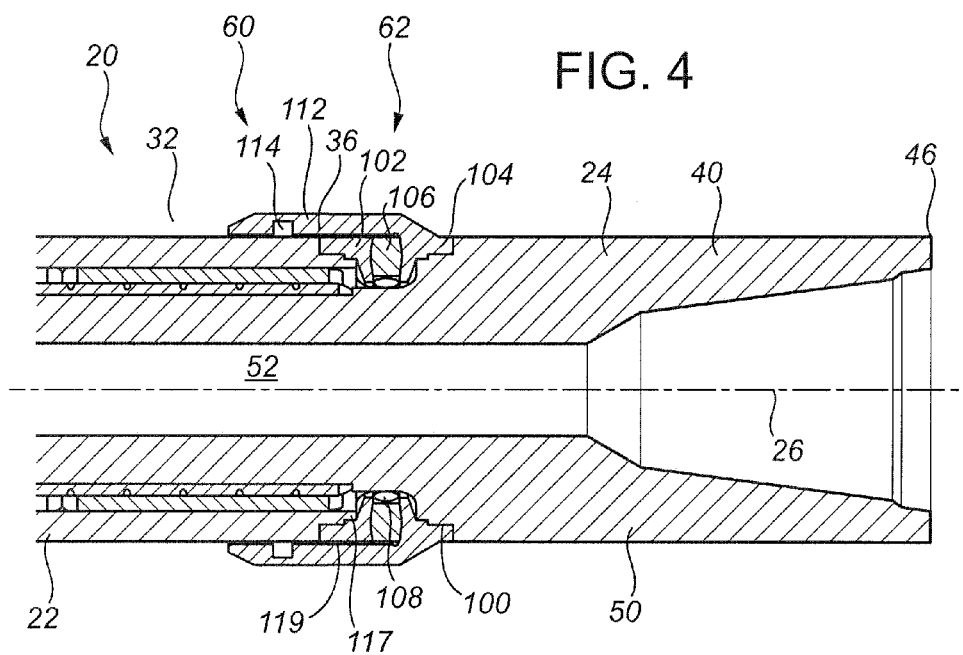
FIG. 4 is a longitudinal section assembly drawing of a portion of the bearing section depicted in FIG. 1, detailing a second alternate embodiment of the first thrust bearing of the bearing assembly.

Referring to FIG. 3 and FIG. 4, detail drawings of a first alternate embodiment and a second alternate embodiment respectively of the first thrust bearing (62) in the bearing section (20) of FIG. 1 are provided. In the alternate embodiments depicted in FIG. 3 and FIG. 4, the first thrust bearing (62) is a rolling element bearing similar to the first thrust bearing (62) which is depicted in FIGS. 1-2.

In the alternate embodiments of the first thrust bearing (62) depicted in FIG. 3 and FIG. 4, the first thrust bearing (62) is further comprised of a shroud (112) for protecting the first thrust bearing (62) at its location at the exterior (32) of the housing (22). The shroud (112) protects the first thrust bearing (62) from damage and wear by shielding components of the first thrust bearing (62).

As depicted in FIG. 3 and FIG. 4, the shroud (112) also inhibits contaminants from contacting the bearing surfaces of the first thrust bearing (62) by isolating the first thrust bearing from the environment at the exterior (32) of the housing (22). In the first alternate embodiment of the first thrust bearing (62) depicted in FIG. 3, the shroud (112) partially isolates the first thrust bearing (62) from the environment at the exterior (32) of the housing (22). In the second alternate embodiment of the first thrust bearing (62) depicted in FIG. 4, the shroud (112) more fully isolates the first thrust bearing (62) from the environment at the exterior (32) of the housing (22).

In the first alternate embodiment of the first thrust bearing (62) depicted in FIG. 3, the shroud (112) provides a partial seal around the first thrust bearing (62) at the exterior (32) of the housing (22) which inhibits materials from entering the first thrust bearing (62) from the exterior (32) of the housing (22) and/or inhibits the loss of lubricant from the first thrust bearing (62). The first alternate embodiment of the first thrust bearing (62) as depicted in FIG. 3 facilitates the use of a grease as a lubricant for the first thrust bearing (62), wherein the first thrust bearing (62) may be packed with the grease (not shown) and the shroud (112) will assist in retaining the grease in and around the first thrust bearing (62).

In the second alternate embodiment of the first thrust bearing (62) depicted in FIG. 4, the shroud (112) is further comprised of a shroud seal (114). The shroud seal (114) provides a more complete seal around the first thrust bearing (62) at the exterior (32) of the housing (22) which inhibits materials from entering the first thrust bearing (62) from the exterior (32) of the housing (22), and/or which inhibits the loss of lubricant from the first thrust bearing (62). The second alternate embodiment of the first thrust bearing (62) as depicted in FIG. 4 facilitates the use of a lubricating oil as a lubricant for the first thrust bearing (62), wherein the first thrust bearing (62) may be in fluid communication with an isolated section of the housing (22) which is filled with lubricating oil so that the first thrust bearing is lubricated by the lubricating oil, and the lubricating oil is prevented by the shroud seal (114) from leaking from the isolated oil-filled section of the housing (22).

As depicted in both FIG. 3 and FIG. 4, the first thrust bearing shaft component (104) is comprised of the shroud (112) so that the shroud (112) is part of the first thrust bearing shaft component (104). More particularly, as depicted in both FIG. 3 and FIG. 4, the shroud (112) is comprised of a tubular extension of the first thrust bearing shaft component (104) which projects toward the proximal housing end (34) of the housing (22).

In the first alternate embodiment of the first thrust bearing (62) depicted in FIG. 3, the shroud (112) is closely fitted to the exterior of the first thrust bearing housing component (102) in order to provide the partial seal.

In the second alternate embodiment of the first thrust bearing (62) depicted in FIG. 4, the shroud (112) extends beyond the first thrust bearing housing component (102) and is closely fitted to the exterior (32) of the housing (22). The shroud seal (114) is positioned in the shroud (112) so that the shroud seal (114) engages with the exterior (32) of the housing (22) in order to provide a substantially full seal between the first thrust bearing shaft component (104) and the exterior (32) of the housing (22).

The configuration for the shroud (112) depicted in FIG. 3 and FIG. 4 provides protection for the first thrust bearing (62) as the drilling motor advances through a borehole and also minimizes the likelihood that the shroud (112) will catch or hang up on the borehole wall as the drilling motor advances through the borehole.

However, the structure and configuration of the shroud (112) as depicted in FIG. 3 is exemplary only. The shroud (112) may be comprised of any structure, apparatus or device and may be provided in any configuration which is suitable for protecting the first thrust bearing (62) and/or for facilitating the use of a grease pack or a lubricating oil as a lubricant for the first thrust bearing (62).

As non-limiting examples, the first thrust bearing housing component (102) instead of the first thrust bearing shaft component (104) may be comprised of the shroud (112) or the shroud (112) may be provided as a component of the first thrust bearing (62) which is separate from both the first thrust bearing housing component (102) and the first thrust bearing shaft component (104). Furthermore, the shroud (112) may project toward the distal housing end (36) or the shroud (104) may be configured as a sleeve (not shown) which fully or substantially surrounds the first thrust bearing (62) and which projects toward both the proximal housing end (34) and the distal housing end (36). Alternate structures and configurations for the shroud (112) may be adapted to provide either a partial seal or a more complete seal of the first thrust bearing (62) having regard to the considerations discussed above.

Figure 5:
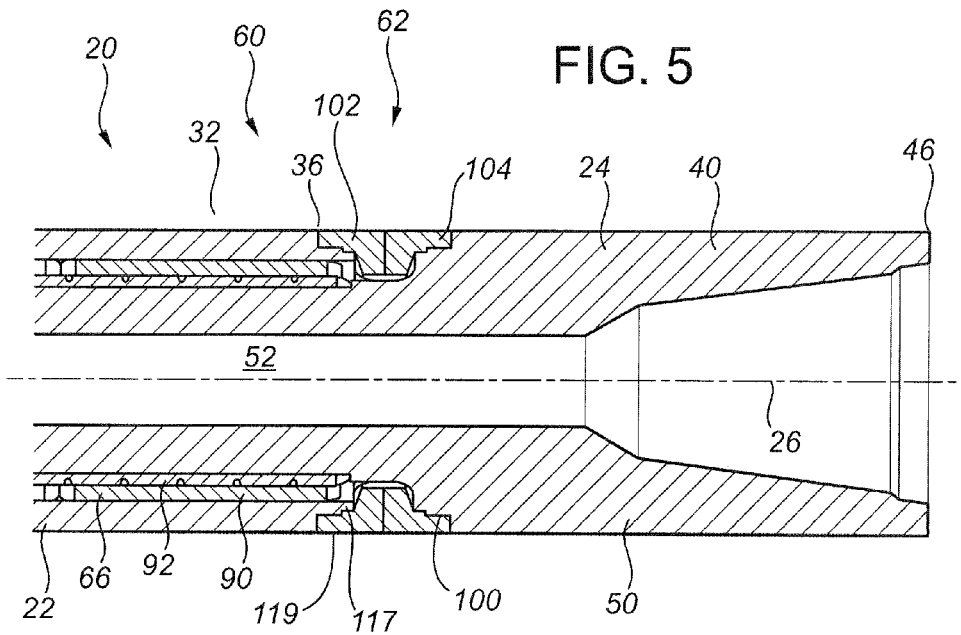
FIG. 5 is a longitudinal section assembly drawing of a portion of the bearing section depicted in FIG. 1, detailing a third alternate embodiment of the first thrust bearing of the bearing assembly.

Referring to FIG. 5, a detail drawing of a third alternate embodiment of the first thrust bearing (62) in the bearing section (20) of FIG. 1 are provided. In the third alternate embodiment of the first thrust bearing (62) depicted in FIG. 5, the first thrust bearing (62) is a plain bearing which is comprised of a first thrust bearing housing component (102) and a first thrust bearing shaft component (104). The first thrust bearing housing component (102) and the first thrust bearing shaft component (104) provide complementary bearing surfaces which may be hardfaced with either diamond or carbide as either a solid matrix affixed to the bearing surfaces or as inserts pressed into the bearing surfaces.

As depicted in FIG. 5, the first thrust bearing housing component (102) is fixedly connected with the housing (22) by being threadably connected with the housing (22) adjacent to the distal housing end (36). The first thrust bearing shaft component (104) is fixedly connected with the shaft (24) by being threadably connected with the shaft (24) adjacent to the first bearing shaft surface (100). Alternatively, the first thrust bearing housing component (102) and/or the first thrust bearing shaft component (104) may be connected with the housing (22) and the shaft (24) respectively in some other manner or may be integrally formed with the housing (22) and the shaft (24) respectively.

As depicted in FIG. 5, the first thrust bearing (62) is a lubricated plain bearing which is lubricated using drilling fluid as a lubricant. The lubricating drilling fluid passes from the proximal housing end (34) through the interior (30) of the housing (22) in the annular space (56) between the housing (22) and the shaft (24), through the second thrust bearing (64), through the radial bearing (66), and thus comes into contact with the first thrust bearing (62).

The bearing surfaces of the first thrust bearing housing component (102) and/or the first thrust bearing shaft component (104) are provided with grooves (not shown in FIG. 5) to facilitate the passage of the drilling fluid through the housing (22) and past the first thrust bearing (64) to the exterior (32) of the housing (22). Alternatively, if the first thrust bearing (62) is not lubricated using drilling fluid as a lubricant so that it is not necessary to pass drilling fluid through the first thrust bearing (62), the grooves may not be required.

The third alternate embodiment of the first thrust bearing (62) depicted in FIG. 5 may be further comprised of a shroud (112) as discussed above and as depicted in FIG. 3 and FIG. 4.

Referring to FIGS. 6-8, drawings of a fourth alternate embodiment of the first thrust bearing (62) in the bearing section (20) of FIG. 1 are provided. In the fourth alternate embodiment of the first thrust bearing (62) depicted in FIGS. 6-8, the first thrust bearing (62) is a plain bearing which is comprised of a first thrust bearing housing component (102) and a first thrust bearing shaft component (104). The first thrust bearing housing component (102) and the first thrust bearing shaft component (104) provide complementary bearing surfaces which may be hardfaced with either diamond or carbide as either a solid matrix affixed to the bearing surfaces or as inserts pressed into the bearing surfaces.

As depicted in FIGS. 6-8, the first thrust bearing housing component (102) is fixedly connected with the housing (22) by being threadably connected with the housing (22) adjacent to the distal housing end (36). The first thrust bearing shaft component (104) is fixedly connected with the shaft (24) by being threadably connected with the shaft (24) adjacent to the first bearing shaft surface (100). Alternatively, the first thrust bearing housing component (102) and/or the first thrust bearing shaft component (104) may be connected with the housing (22) and the shaft (24) respectively in some other manner or may be integrally formed with the housing (22) and the shaft (24) respectively.

A distinction between the third alternate embodiment of the first thrust bearing (62) depicted in FIG. 5 and the fourth alternate embodiment of the first thrust bearing (62) depicted in FIGS. 6-8 is that the fourth alternate embodiment of the first thrust bearing (62) is a curved plain bearing. More particularly, in the fourth alternate embodiment the first thrust bearing housing component (102) and the first thrust bearing shaft component (104) provide complementary curved bearing surfaces.

Referring to FIG. 6, the curved bearing surfaces may be substantially spherical bearing surfaces. The center of curvature for the substantially spherical bearing surfaces may be an anticipated bend location on the shaft axis (26) of the shaft (24) relative to the housing (22).

The complementary curved bearing surfaces of the fourth alternate embodiment of the first thrust bearing (62) may assist in providing a consistent engagement between the bearing surfaces as the shaft (24) bends relative to the housing (22) during use of the apparatus and/or as the radial bearing (66) wears during use of the apparatus.

As depicted in FIGS. 6-8, the first thrust bearing (62) is a lubricated curved plain bearing which is lubricated using drilling fluid as a lubricant. The lubricating drilling fluid passes from the proximal housing end (34) through the interior (30) of the housing (22) in the annular space (56) between the housing (22) and the shaft (24), through the second thrust bearing (64), through the radial bearing (66), and thus comes into contact with the first thrust bearing (62).

Referring to FIG. 7 and FIG. 8, the bearing surfaces of the first thrust bearing housing component (102) and/or the first thrust bearing shaft component (104) are provided with grooves (116) to facilitate the passage of the drilling fluid through the housing (22) and past the first thrust bearing (64) to the exterior (32) of the housing (22). Alternatively, if the first thrust bearing (62) is not lubricated using drilling fluid as a lubricant so that it is not necessary to pass drilling fluid through the first thrust bearing (62), the grooves may not be required.

The fourth alternate embodiment of the first thrust bearing (62) as depicted in FIGS. 6-8 may be adapted to utilize a rolling element bearing instead of a plain bearing, therefore providing a curved rolling element bearing as the first thrust bearing (62).

The fourth alternate embodiment of the first thrust bearing (62) as depicted in FIGS. 6-8 may also be adapted to utilize a thrust bearing similar to that described in U.S. Pat. No. 7,552,782 (Sexton et al), wherein the first thrust bearing (62) is comprised of a curved seat, a first bearing component having a bearing surface and a complementary curved surface for engaging the curved seat, and a second bearing component having a bearing surface which is complementary to the bearing surface on the first bearing component. This adaptation of the fourth alternate embodiment of the first thrust bearing (62) may assist in providing a consistent engagement between the bearing surfaces as the shaft (24) bends relative to the housing (22) during use of the apparatus and/or as the radial bearing (66) wears during use of the apparatus, while facilitating the use of planar or flat bearing surfaces.

The complementary curved bearing surfaces and/or engagement surfaces which are contemplated in the fourth alternate embodiment of the first thrust bearing (62) may therefore assist in providing the first thrust bearing (62) with a "self-aligning feature" to accommodate relative movement of the shaft (24) and the housing (22), which may be due to loading on the apparatus during use or which may be due to wear of components of the apparatus such as the radial bearing (66).

Any of the embodiments of the first thrust bearing (62) described above and depicted in FIGS. 1-2, FIG. 5, or FIGS. 6-8 may be further comprised of the shroud (112) as discussed above and as depicted in FIG. 3 and FIG. 4.

In all of the embodiments of the first thrust bearing (62) which are depicted in FIGS. 1-8, the distal housing end (36) has an inner dimension (117) and the interior (30) of the housing (22) has a maximum inner dimension (118). The first thrust bearing (62) has an outer dimension (119). As depicted in FIG. 1 and FIG. 2, the outer dimension (119) of the first thrust bearing (62) is greater than both the inner dimension (117) of the distal housing end (36) and the maximum inner dimension (118) of the housing (22). As depicted in FIGS. 1-8, the outer dimension (110) of the first thrust bearing (62) is substantially "flush" with the exterior (32) of the housing (22).

Locating the first thrust bearing (62) at the exterior (32) of the housing (22) enables the first thrust bearing (62) to provide a larger bearing area than it would be if it were located within the interior (30) of the housing (22), thereby enabling the first thrust bearing (62) potentially to provide an increased bearing capacity over prior art thrust bearings which are contained within housings.

This increased bearing capacity of the first thrust bearing (62) may facilitate a shortening of the bearing section (20) of the drilling motor relative to conventional drilling motors, which in turn may reduce the bit to bend length for a bent drilling motor or a bent housing drilling motor. An overall shortened bearing section (20) is possible even where the radial bearing (66) extends axially for substantially length between the first thrust bearing (62) and the second thrust bearing (64), due to the reduced length of the bearing section (20) which can be achieved by locating the first thrust bearing (62) at the exterior (32) of the housing (22).

Another potential advantage of locating the first thrust bearing (62) at the exterior (32) of the housing (22) is that the diameter of the shaft (24) may potentially be increased in comparison with conventional drilling motors, since the annular space (56) between the housing (22) and the shaft (24) does not need to accommodate the first thrust bearing (62). Increasing the diameter of the shaft (24) will facilitate an increased torque capacity for the shaft (24) and will also facilitate a larger shaft bore (52). A larger shaft bore (52) will result in reduced pressures through the drilling motor and reduced fluid velocities through the shaft bore (52), thus reducing the potential for erosion wear of the shaft (24) and the drilling motor.

Referring to FIGS. 9-10, the bearing assembly of the invention is associated with a non-rotating stabilizer as the apparatus. The non-rotating stabilizer is adapted to be connected with a drill bit (not shown), drill pipe (not shown), coiled tubing (not shown), a steering tool (not shown), and/or with other tools or components of a drill string (not shown) during drilling of a borehole and functions to stabilize the drill string as the drill string advances through the borehole.

Many of the features of the embodiment of FIGS. 9-10 where the apparatus is a non-rotating stabilizer are similar to features of the embodiments of FIGS. 1-8 where the apparatus is a drilling motor. In the discussion of FIGS. 9-10 which follows, features of the non-rotating stabilizer of FIGS. 9-10 which are equivalent to features of the drilling motor of FIGS. 1-8 are assigned similar reference numbers, increased by 100.

Referring to FIG. 9, the non-rotating stabilizer (120) is comprised of a non-rotating sleeve as a housing (122) and a shaft (124). The shaft (124) has a shaft axis (126). The housing (122) defines an interior (130) of the housing (122), an exterior (132) of the housing (122), a proximal housing end (134), and a distal housing end (136).

The shaft (124) extends through the interior (130) of the housing (122) and is rotatably connected with the housing (122) for rotation about the shaft axis (126). The shaft (124) defines a proximal shaft end (144) and a distal shaft end (146).

The proximal shaft end (144) may be adapted to be connected with drill pipe (not shown), coiled tubing (not shown), a steering tool (not shown), or with another tool or component of a drill string (not shown). The distal shaft end (146) may be adapted to be connected with a drill bit (not shown), or may be adapted to be connected with drill pipe (not shown), coiled tubing (not shown), a steering tool (not shown), or with another tool or component of a drill string (not shown).

As depicted in FIG. 9, the distal shaft end (146) is connected with a coupling (148). A drill bit (not shown), drill pipe (not shown), coiled tubing (not shown), steering tool (not shown), or other tool or component of a drill string (not shown) may be connected with the coupling (148).

The shaft (124) comprises a shaft extension (150) which extends from the interior (130) of the housing (122) at the proximal housing end (134) and terminates at the proximal shaft end (144).

The shaft (124) defines a shaft bore (152) which extends through the shaft (124). A purpose of the shaft bore (152) is to convey a drilling fluid (not shown) through the shaft (124) to the components of the drill string (not shown), such as the drill bit (not shown), which are located below the distal shaft end (146). An annular space (156) is defined in the interior (130) of the housing (122) between the housing (122) and the shaft (124).

The housing (122) is comprised of a stabilizer assembly (158) which is mounted on the exterior (132) of the housing (122). A plurality of housing ports (159) are provided in the housing (122) to provide fluid communication between the interior (130) of the housing (122) and the stabilizer assembly (158). The housing ports (159) facilitate lubrication of the stabilizer assembly (158) by drilling fluid which is diverted from the shaft bore (152), as described below.

The non-rotating stabilizer (120) includes a bearing assembly (160). As depicted in FIG. 9, the bearing assembly (160) is comprised of a first thrust bearing (162), a second thrust bearing (164), and a radial bearing (166).

The first thrust bearing (162) is located at the exterior (132) of the housing (122). As depicted in FIG. 9, the second thrust bearing (164) is located within the interior (130) of the housing (122). As depicted in FIG. 9, the radial bearing (166) is located within the interior (130) of the housing (122) and is located axially between the first thrust bearing (162) and the second thrust bearing (164).

The purpose of the first thrust bearing (162) is to transfer a first axial load between the shaft (124) and the housing (122). The purpose of the second thrust bearing (164) is to transfer a second axial load between the shaft (124) and the housing (122). The purpose of the radial bearing (166) is to transfer a radial load between the shaft (124) and the housing (122).

The first axial load is in a first axial direction, the second axial load is in a second axial direction, and the first axial direction is opposite to the second axial direction. The bearing assembly (160) is configured so that the expected maximum first axial load is greater than the expected maximum second axial load.

In the embodiments of FIGS. 9-10 in which the apparatus is a non-rotating stabilizer (120), the axial loads will place the shaft (124) in either compression or tension. The shaft (124) will tend to be in compression during advancement of the drill string through the borehole as the housing (122) engages the sides of the borehole and impedes the advancement of the drill string through the borehole. The shaft (124) will tend to be in tension during removal of the drill string from the borehole as the housing (122) engages the sides of the borehole and impedes the removal of the drill string from the borehole.

These compressive and tensile loads must be transferred between the shaft (124) and the housing (122) since the housing (122) is connected with the shaft (124) and the shaft (124) is connected with the drill string. Typically in the use of a non-rotating stabilizer (120), the maximum compressive load on the shaft (124) will be greater than the maximum tensile load on the shaft (124).

As a result, in the embodiments of FIGS. 9-10, the first axial direction is the direction in which the axial load will place the shaft (124) in compression so that the first axial load is a compressive load on the shaft (124), and the second axial direction is the direction in which the axial load will place the shaft (124) in tension so that the second axial load is a tensile load on the shaft (24).

In the embodiment of FIGS. 9-10, the second thrust bearing (164) is located within the interior (130) of the housing (122). More particularly, the second thrust bearing (164) is contained in the annular space (156) between the housing (122) and the shaft (124).

As depicted in FIG. 9, the second thrust bearing (164) is a plain bearing comprising a second thrust bearing housing component (170) and a second thrust bearing shaft component (172). The second thrust bearing housing component (170) is keyed or otherwise fixedly connected with the housing (122) so that it will rotate with the housing (122). The second thrust bearing shaft component (172) is keyed or otherwise fixedly connected with the shaft (124) so that it will rotate with the shaft (124). The second thrust bearing housing component (170) and the second thrust bearing shaft component (172) provide complementary bearing surfaces which may be hardfaced with either diamond or carbide as either a solid matrix affixed to the bearing surfaces or as inserts pressed into the bearing surfaces.

In the embodiment of FIG. 9-10, the second thrust bearing (164) further comprises a preloading mechanism (174). As depicted in FIG. 9, the preloading mechanism (74) is comprised of a plurality of spring elements, such as Belleville springs which are interposed between a shoulder (176) on the coupling (148) and the second thrust bearing shaft component (172). The preloading mechanism (174) urges the second thrust bearing shaft component (172) into engagement with the second thrust bearing housing component (170) and provides travel to accommodate an amount of relative axial movement between the housing (122) and the shaft (124).

As depicted in FIG. 9, the second thrust bearing (164) is a lubricated plain bearing which is lubricated using drilling fluid as a lubricant. The lubricating drilling fluid passes from the proximal shaft end (144) through the shaft bore (152) toward the distal shaft end (146). A portion of the drilling fluid is diverted from the shaft bore (152) to the annular space (156) between the housing (122) and the shaft (124) through shaft ports (182) formed in the shaft (124), passes through the radial bearing (166) and thus comes into contact with the second thrust bearing (164).

The bearing surfaces of the second thrust bearing housing component (170) and/or the second thrust bearing shaft component (172) are provided with grooves (not shown in FIG. 9) to facilitate the passage of the drilling fluid past the second thrust bearing (164). Alternatively, if the second thrust bearing (164) is not lubricated using drilling fluid as a lubricant so that it is not necessary to pass drilling fluid through the second thrust bearing (164), the grooves may not be required.

The second thrust bearing (164) may be provided with complementary curved bearing surfaces and/or engagement surfaces as contemplated in the fourth alternate embodiment of the first thrust bearing (62). As in the case of the first thrust bearing (62), these complementary curved surfaces may assist in providing the second thrust bearing (164) with a "self-aligning feature" to accommodate relative movement of the shaft (24) and the housing (22), which may be due to loading on the apparatus during use or which may be due to wear of components of the apparatus such as the radial bearing (66).

In the embodiment of FIGS. 9-10, the radial bearing (166) is a plain bearing which is located within the interior (130) of the housing (122) and which is located axially between the first thrust bearing (162) and the second thrust bearing (164). As depicted in FIG. 9, the radial bearing (166) extends axially for substantially the entire length between the first thrust bearing (162) and the second thrust bearing (164).

Referring to FIG. 9, the radial bearing (166) is comprised of a radial bearing housing component (190) associated with the housing (122). The radial bearing housing component (190) may be comprised of the housing (122), in which case the housing (122) may be hardfaced to provide a wear resistant bearing surface on the housing (122). As depicted in FIG. 9, the radial bearing housing component (190) is comprised of a radial bearing housing sleeve which is either pressed into the housing (122) or mounted in a carrier (not shown) which is formed in the housing (122).

As depicted in FIG. 9, the radial bearing housing sleeve is axially segmented so that the radial bearing housing sleeve is comprised of a plurality of axial segments. The radial bearing housing sleeve is axially segmented so that bending stresses exerted on the housing (122) do not crack or otherwise damage the radial bearing housing sleeve.

Referring to FIG. 1, the radial bearing (166) is further comprised of a radial bearing shaft component (192) associated with the shaft (124). The radial bearing shaft component (192) may be comprised of a radial bearing shaft sleeve which may be pressed onto the shaft (124). As depicted in FIG. 9, the radial bearing shaft component (192) is comprised of the shaft (124). The shaft (124) may be hardfaced to provide a wear resistant bearing surface on the shaft (124).

As depicted in FIG. 9, the radial bearing (166) is a lubricated plain bearing which is lubricated using drilling fluid as a lubricant. The lubricating drilling fluid passes from the proximal shaft end (144) through the shaft bore (152) toward the distal shaft end (146). A portion of the drilling fluid is diverted from the shaft bore (152) to the annular space (156) between the housing (122) and the shaft (124) through the shaft ports (182) formed in the shaft (124) and thus comes into contact with the radial bearing (166). Adequate clearance is provided between the radial bearing housing component (190) and the radial bearing shaft component (192) to facilitate the passage of the drilling fluid through the housing (122) and through the radial bearing (166).

In the embodiment of FIGS. 9-10, the first thrust bearing (162) is a plain bearing which is located at the exterior (132) of the housing (122). More particularly, as depicted in both FIG. 9 and in the detail drawing of FIG. 10, the shaft extension (150) defines a first bearing shaft surface (200) and the first thrust bearing (162) is located axially between the proximal housing end (134) and the first bearing shaft surface (200). The proximal housing end (134) and the first bearing shaft surface (200) provide surfaces on the housing (122) and the shaft (124) respectively to support the first thrust bearing (162).

In the embodiment of the first thrust bearing (162) depicted in FIGS. 9-10, the first thrust bearing (162) is comprised of a first thrust bearing housing component (202) and a first thrust bearing shaft component (104). The first thrust bearing housing component (202) and the first thrust bearing shaft component (204) provide complementary bearing surfaces which may be hardfaced with either diamond or carbide as either a solid matrix affixed to the bearing surfaces or as inserts pressed into the bearing surfaces.

As depicted in FIGS. 9-10, the first thrust bearing housing component (202) is fixedly connected with the housing (122) by being threadably connected with the housing (122) adjacent to the proximal housing end (134). The first thrust bearing shaft component (204) is fixedly connected with the shaft (124) by being threadably connected with the shaft (124) adjacent to the first bearing shaft surface (200). Alternatively, the first thrust bearing housing component (202) and/or the first thrust bearing shaft component (204) may be connected with the housing (122) and the shaft (124) respectively in some other manner or may be integrally formed with the housing (122) and the shaft (124) respectively.

As depicted in FIGS. 9-10, the first thrust bearing (162) is a lubricated plain bearing which is lubricated using drilling fluid as a lubricant. The lubricating drilling fluid passes from the proximal shaft end (144) through the shaft bore (152) toward the distal shaft end (146). A portion of the drilling fluid is diverted from the shaft bore (152) to the annular space (156) between the housing (122) and the shaft (124) through the shaft ports (182) formed in the shaft (124), passes through the radial bearing (166) and thus comes into contact with the first thrust bearing (162).

The bearing surfaces of the first thrust bearing housing component (202) and/or the first thrust bearing shaft component (204) are provided with grooves (216) to facilitate the passage of the drilling fluid through the housing (122) and past the first thrust bearing (162) to the exterior (132) of the housing (122). Alternatively, if the first thrust bearing (62) is not lubricated using drilling fluid as a lubricant so that it is not necessary to pass drilling fluid through the first thrust bearing (162), the grooves (216) may not be required.

In the embodiment of FIGS. 9-10, the stabilizer assembly (158) is lubricated using drilling fluid as a lubricant. Referring to FIG. 1, the drilling fluid which is diverted from the shaft bore (152) to the annular space (156) between the housing (122) and the shaft (124) through the shaft ports (182) formed in the shaft (124), passes through the radial bearing (166), passes through the housing ports (159), and thus comes into contact with the stabilizer assembly (158).

The embodiment of the first thrust bearing (162) depicted in FIGS. 9-10 may be adapted to utilize a rolling element bearing similar to the first thrust bearing (62) as described and depicted in FIGS. 1-2 in connection with the drilling motor, to utilize a curved plain bearing as the first thrust bearing (62) as described and depicted in FIGS. 6-8 in connection with the drilling motor, or to utilize a curved rolling element bearing as the first thrust bearing (162) as described in connection with the drilling motor. Similarly, any of the embodiments of the first thrust bearing (162) may be adapted to provide the shroud (112) which is described and depicted in either FIG. 3 or FIG. 4 in connection with the drilling motor.

In the embodiment of the first thrust bearing (162) which is depicted in FIGS. 9-10, the proximal housing end (134) has an inner dimension (217) and the interior (130) of the housing (122) has a maximum inner dimension (218). The first thrust bearing (162) has an outer dimension (219). As depicted in FIG. 1 and FIG. 2, the outer dimension (219) of the first thrust bearing (162) is greater than both the inner dimension (217) of the distal housing end (136) and the maximum inner dimension (218) of the housing (122). As depicted in FIGS. 9-10, the outer dimension (210) of the first thrust bearing (162) is substantially "flush" with the exterior (132) of the housing (122).

Locating the first thrust bearing (162) at the exterior (132) of the housing (122) enables the first thrust bearing (162) to provide a larger bearing area than it would be if it were located within the interior (130) of the housing (122), thereby enabling the first thrust bearing (162) potentially to provide an increased bearing capacity over prior art thrust bearings which are contained within housings.

This increased bearing capacity of the first thrust bearing (162) may facilitate a shortening of the bearing assembly (160) and thus a shortening of the non-rotating stabilizer (120), which in turn may reduce the bit to bend length where the non-rotating stabilizer (120) is located adjacent to a drill bit in directional drilling applications. An overall shortened bearing assembly (160) is possible even where the radial bearing (166) extends axially for substantially length between the first thrust bearing (162) and the second thrust bearing (164), due to the reduced length of the bearing assembly (160) which can be achieved by locating the first thrust bearing (162) at the exterior (132) of the housing (122).

Another potential advantage of locating the first thrust bearing (162) at the exterior (132) of the housing (122) is that the diameter of the shaft (124) may potentially be increased in comparison with conventional non-rotating stabilizers, since the annular space (156) between the housing (122) and the shaft (124) does not need to accommodate the first thrust bearing (162). Increasing the diameter of the shaft (124) will facilitate an increased torque capacity for the shaft (24) and will also facilitate a larger shaft bore (152). A larger shaft bore (152) will result in reduced pressures through the non-rotating stabilizer (120) and reduced fluid velocities through the shaft bore (152), thus reducing the potential for erosion wear of the shaft (124).

In the embodiments described above with reference to FIGS. 1-8, the apparatus is a drilling motor. In the embodiments described above with reference to FIGS. 9-10, the apparatus is a non-rotating stabilizer (120). The application of the invention is not limited to the specific embodiments described above and depicted in FIGS. 1-10, nor is the application of the invention limited to a drilling motor or a non-rotating stabilizer (120) as the apparatus in which the bearing assembly is used.

In applications of the invention in which the apparatus is a drilling motor, the drilling motor may be connected as a component of a drill string at any suitable position in the drill string. More particularly, the drilling motor may be connected in the drill string such that tools or other components of the drill string may be connected with either or both ends of the drilling motor. For example, steering tools (not shown) or other tools or components of the drill string (not shown) may be connected proximally (i.e., above) or distally (i.e., below) the drilling motor.

Similarly, in applications of the invention in which the apparatus is a non-rotating stabilizer (120), the non-rotating stabilizer (120) may be connected as a component of a drill string at any suitable position in the drill string. More particularly, the non-rotating stabilizer (120) may be connected in the drill string such that tools or other components of the drill string may be connected with either or both ends of the non-rotating stabilizer (120). For example, steering tools (not shown) or other tools or components of the drill string (not shown) may be connected proximally (i.e. above) or distally (i.e., below) the non-rotating stabilizer (120).

In an example of the use of the specific embodiment of the invention of FIGS. 1-8, a drilling motor may comprise a power section (not shown), a transmission section (not shown), and the bearing section (20) as described herein. The sections of the drilling motor typically comprise separate housing sections which are connected together end to end. The housing of the power section is typically connected with drill pipe (not shown), coiled tubing (not shown), a steering tool (not shown), or with another tool or component of a drill string (not shown). The shaft (24) of the bearing section (20) is rotatably connected with the bearing section housing (22) and the shaft (24) is typically also connected with a drill bit (not shown) or with drill pipe (not shown), coiled tubing (not shown), a steering tool (not shown), or with another tool or component of a drill string (not shown).

The drill string and the drilling motor are used to drill a borehole (not shown). In order to drill the borehole, all or a portion of the weight of the drill string is transferred from the drill string to the housing (22), from the housing (22) to the shaft (24), and from the shaft (24) to the drill bit, thus producing a weight on bit at the drill bit which is transferred to the end of the borehole while the shaft (24) and the drill bit are rotated by the power section of the drilling motor.

A reaction force exerted by the end of the borehole upon the drill bit places the shaft (24), the housing (22) and the drill string in compression. This first axial load is transferred between the shaft (24) and the housing (22) by the first thrust bearing (62).

Drilling may also result in radial loads (i.e., side loads) being exerted on the drill string and the drilling motor. These radial loads are transferred between the shaft (24) and the housing (22) by the radial bearing (66).

It may be necessary to interrupt drilling periodically either to lift the drill string temporarily or to remove the drill string from the borehole. Lifting the drill string places the shaft (24), the housing (22) and the drill string in tension due to the weight of the drill string. If the drill bit and/or the shaft (24) become partially or completely stuck in the borehole as the drill string is lifted, the amount of the tensile force will be increased. This second axial load is transferred between the shaft (24) and the housing (22) by the second thrust bearing (64).

In an example of the use of the specific embodiment of the invention of FIGS. 9-10, the proximal shaft end (144) of the shaft (124) of the non-rotating stabilizer (120) is typically connected with drill pipe (not shown), coiled tubing (not shown), a steering tool (not shown), or with another tool or component of a drill string (not shown) and the distal shaft end (146) of the shaft (124) of the non-rotating stabilizer (120) is typically connected with a drill bit (not shown) or with drill pipe (not shown), coiled tubing (not shown), a steering tool (not shown), or with another tool or component of a drill string (not shown). The housing (122) of the non-rotating stabilizer (120) is rotatably connected with the shaft (124) so that the housing (122) may remain substantially stationary as the drill string and the shaft (124) are rotated.

The drill string and the non-rotating stabilizer (20) are used to drill a borehole (not shown). In order to drill the borehole, all or a portion of the weight of the drill string is transferred from the drill string to the shaft (124) and from the shaft (124) to the drill bit, thus producing a weight on bit at the drill bit which is transferred to the end of the borehole while the drill string, the shaft (124) and the drill bit are rotated by a rotary table on the drilling rig (not shown). Alternatively or additionally, the shaft (124) and the drill bit may be rotated by a drilling motor which is connected with the drill string.

A reaction force exerted by the end of the borehole upon the drill bit places the shaft (124) in compression. The housing (122) engages the sides of the borehole because it has a larger gauge than the shaft (124) and the drill bit, and thus resists axial movement of the drill string by an axial force which is exerted on the housing (122) by the sides of the borehole and which effectively lessens the weight on bit. This first axial load which results from the engagement of the housing (122) with the sides of the borehole is transferred between the shaft (24) and the housing (22) by the first thrust bearing (62).

Drilling may also result in radial loads (i.e., side loads) being exerted on the drill string, the shaft (124) and the housing (122). These radial loads are transferred between the shaft (124) and the housing (122) by the radial bearing (166).

It may be necessary to interrupt drilling periodically either to lift the drill string temporarily or to remove the drill string from the borehole. Lifting the drill string places the shaft (24) in tension due to the weight of the drill string. If the housing (122) becomes partially or completely stuck in the borehole while the drill string is lifted, the amount of the tensile force will be increased. This second axial load is transferred between the shaft (124) and the housing (122) by the second thrust bearing (164).

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

The embodiments of the invention in which an exclusive property or privilege is claimed are defined as follows:

1. A bearing assembly for use in an apparatus comprising a housing and a shaft, wherein the shaft has a shaft axis, wherein the shaft is rotatably connected with the housing, wherein the housing defines an interior of the housing, an exterior of the housing and a first housing end, wherein the shaft is comprised of a shaft extension which extends from the interior of the housing at the first housing end, and wherein the shaft extension defines a first bearing shaft surface, the bearing assembly comprising a first thrust bearing for transferring a first axial load between the shaft and the housing, wherein the first thrust bearing is located axially between the first housing end and the first bearing shaft surface, wherein the first thrust bearing is a rolling element bearing, and wherein the first thrust bearing is further comprised of a lubricant selected from the group consisting of a lubricating oil and a grease.

2. The bearing assembly as claimed in claim 1 wherein the first housing end has an inner dimension, wherein the first thrust bearing has an outer dimension, and wherein the outer dimension of the first thrust bearing is greater than the inner dimension of the first housing end.

3. The bearing assembly as claimed in claim 1 wherein the apparatus is an apparatus for use in drilling a borehole.

4. The bearing assembly as claimed in claim 1 wherein the housing is a drilling motor housing, wherein the drilling motor housing has a distal end and a proximal end, and wherein the distal end of the drilling motor housing is the first housing end.

5. The bearing assembly as claimed in claim 1 wherein the housing is a non-rotating sleeve, wherein the non-rotating sleeve has a distal end and a proximal end, and wherein the proximal end of the non-rotating sleeve is the first housing end.

6. A bearing assembly for use in an apparatus comprising a housing and a shaft, wherein the shaft has a shaft axis, wherein the shaft is rotatably connected with the housing, wherein the housing defines an interior of the housing, an exterior of the housing and a first housing end, wherein the shaft is comprised of a shaft extension which extends from the interior of the housing at the first housing end, and wherein the shaft extension defines a first bearing shaft surface, the bearing assembly comprising a first thrust bearing for transferring a first axial load between the shaft and the housing, wherein the first thrust bearing is located axially between the first housing end and the first bearing shaft surface, wherein the first thrust bearing is a rolling element bearing, wherein the rolling element bearing is comprised of a first thrust bearing housing component connected with the housing, a first thrust bearing shaft component connected with the shaft and a first thrust bearing rolling element component positioned between the first thrust bearing housing component and the first thrust bearing shaft component, and wherein the first thrust bearing is further comprised of a shroud for at least partially isolating the first thrust bearing from an environment at the exterior of the housing by providing at least a partial seal of the first thrust bearing.

7. The bearing assembly as claimed in claim 6 wherein the first thrust bearing rolling element component is comprised of a plurality of rolling elements suspended in a rolling element cage.

8. The bearing assembly as claimed in claim 7 wherein each of the plurality of rolling elements is comprised of a roller.

9. The bearing assembly as claimed in claim 6 wherein the first thrust bearing is further comprised of a lubricant selected from the group consisting of a lubricating oil and a grease.

10. The bearing assembly as claimed in claim 6 wherein one of the first thrust bearing housing component and the first thrust bearing shaft component is comprised of the shroud.

11. The bearing assembly as claimed in claim 10 wherein the first thrust bearing shaft component is comprised of the shroud, wherein the shroud is comprised of a tubular extension, and wherein the tubular extension extends towards the exterior of the housing to at least the first thrust bearing housing component in order to provide at least a partial seal around the first thrust bearing.

12. The bearing assembly as claimed in claim 11 wherein the first thrust bearing is further comprised of a lubricant, wherein the lubricant is a grease.

13. The bearing assembly as claimed in claim 11 wherein the shroud fully isolates the first thrust bearing from the environment at the exterior of the housing.

14. The bearing assembly as claimed in claim 13 wherein the tubular extension extends to the exterior of the housing and wherein the shroud is further comprised of a shroud seal positioned between the tubular extension and the exterior of the housing to substantially seal between the first thrust bearing shaft component and the exterior of the housing.

15. The bearing assembly as claimed in claim 14 wherein the first thrust bearing is further comprised of a lubricant, wherein the lubricant is a lubricating oil.

16. The bearing assembly as claimed in claim 15 wherein the first thrust bearing is in fluid communication with an isolated section of the housing filled with the lubricating oil.

17. The bearing assembly as claimed in claim 6 wherein the first housing end has an inner dimension, wherein the first thrust bearing has an outer dimension, and wherein the outer dimension of the first thrust bearing is greater than the inner dimension of the first housing end.

18. The bearing assembly as claimed in claim 6 wherein the apparatus is an apparatus for use in drilling a borehole.

19. The bearing assembly as claimed in claim 6 wherein the housing is a drilling motor housing, wherein the drilling motor housing has a distal end and a proximal end, and wherein the distal end of the drilling motor housing is the first housing end.

20. The bearing assembly as claimed in claim 6 wherein the housing is a non-rotating sleeve, wherein the non-rotating sleeve has a distal end and a proximal end, and wherein the proximal end of the non-rotating sleeve is the first housing end.

21. A bearing assembly for use in an apparatus comprising a housing and a shaft, wherein the shaft has a shaft axis, wherein the shaft is rotatably connected with the housing, wherein the housing defines an interior of the housing, an exterior of the housing and a first housing end, wherein the shaft is comprised of a shaft extension which extends from the interior of the housing at the first housing end, and wherein the shaft extension defines a first bearing shaft surface, the bearing assembly comprising:
  (a) a first thrust bearing for transferring a first axial load between the shaft and the housing, wherein the first thrust bearing is located axially between the first housing end and the first bearing shaft surface;
  (b) a second thrust bearing for transferring a second axial load between the shaft and the housing, wherein the second thrust bearing is comprised of a preloading mechanism; and
  (c) a drive shaft catcher for limiting an amount of relative axial movement between the housing and the shaft.

22. The bearing assembly as claimed in claim 21 wherein the first housing end has an inner dimension, wherein the first thrust bearing has an outer dimension, and wherein the outer dimension of the first thrust bearing is greater than the inner dimension of the first housing end.

23. The bearing assembly as claimed in claim 21 wherein the second thrust bearing is located within the interior of the housing.

24. The bearing assembly as claimed in claim 21 wherein the second thrust bearing is comprised of a second thrust bearing housing component connected with the housing and a second thrust bearing shaft component connected with the shaft, and wherein the preloading mechanism urges the second thrust bearing shaft component toward the second thrust bearing housing component.

25. The bearing assembly as claimed in claim 24 wherein the preloading mechanism is comprised of a plurality of spring elements.

26. The bearing assembly as claimed in claim 21 wherein the drive shaft catcher is comprised of a protrusion on an external surface of the shaft configured to engage a complementary shoulder defined by the interior of the housing.

27. The bearing assembly as claimed in claim 21 wherein the apparatus is an apparatus for use in drilling a borehole.

28. The bearing assembly as claimed in claim 21 wherein the housing is a drilling motor housing, wherein the drilling motor housing has a distal end and a proximal end, and wherein the distal end of the drilling motor housing is the first housing end.

29. The bearing assembly as claimed in claim 21 wherein the housing is a non-rotating sleeve, wherein the non-rotating sleeve has a distal end and a proximal end, and wherein the proximal end of the non-rotating sleeve is the first housing end.

30. A bearing assembly for use in an apparatus comprising a housing and a shaft, wherein the shaft has a shaft axis, wherein the shaft is rotatably connected with the housing, wherein the housing defines an interior of the housing, an exterior of the housing and a first housing end, wherein the shaft is comprised of a shaft extension which extends from the interior of the housing at the first housing end, and wherein the shaft extension defines a first bearing shaft surface, the bearing assembly comprising a first thrust bearing for transferring a first axial load between the shaft and the housing, wherein the first thrust bearing is located axially between the first housing end and the first bearing shaft surface, and wherein the first thrust bearing is a curved bearing.

31. The bearing assembly as claimed in claim 30 wherein the first housing end has an inner dimension, wherein the first thrust bearing has an outer dimension, and wherein the outer dimension of the first thrust bearing is greater than the inner dimension of the first housing end.

32. The bearing assembly as claimed in claim 30 wherein the curved bearing is comprised of a first thrust bearing housing component connected with the housing and a first thrust bearing shaft component connected with the shaft, wherein each of the first thrust bearing housing component and the first thrust bearing shaft component includes a complementary curved bearing surface.

33. The bearing assembly as claimed in claim 32 wherein each of the complementary curved bearing surfaces is substantially spherical.

34. The bearing assembly as claimed in claim 32 wherein an annular space is defined between the interior of the housing and the shaft, wherein the annular space communicates with the first thrust bearing and wherein the first thrust bearing is lubricated by a drilling fluid passing through the annular space.

35. The bearing assembly as claimed in claim 34 wherein the first thrust bearing is adapted to permit the passage of the drilling fluid from the annular space to the exterior of the housing between the first thrust bearing housing component and the first thrust bearing shaft component.

36. The bearing assembly as claimed in claim 30 wherein the curved bearing is a curved plain bearing.

37. The bearing assembly as claimed in claim 36 wherein the curved bearing surface of at least one of the first thrust bearing housing component and the first thrust bearing shaft component defines at least one groove to facilitate the passage of the drilling fluid.

38. The bearing assembly as claimed in claim 37 wherein the at least one groove is a spiral groove.

39. The bearing assembly as claimed in claim 30 wherein the apparatus is an apparatus for use in drilling a borehole.

40. The bearing assembly as claimed in claim 30 wherein the housing is a drilling motor housing, wherein the drilling motor housing has a distal end and a proximal end, and wherein the distal end of the drilling motor housing is the first housing end.

41. The bearing assembly as claimed in claim 30 wherein the housing is a non-rotating sleeve, wherein the non-rotating sleeve has a distal end and a proximal end, and wherein the proximal end of the non-rotating sleeve is the first housing end.

* * * * *